(12) United States Patent
Cipolla et al.

(10) Patent No.: US 11,162,433 B2
(45) Date of Patent: Nov. 2, 2021

(54) METHOD OF CONTROLLING GAS GENERATOR POWER AND TORQUE OUTPUT

(71) Applicant: GE Avio S.r.l., Rivalta di Torino (IT)

(72) Inventors: Lorenzo Cipolla, Rivalta di Torino (IT); Giampaolo Gabbi, Florence (IT); Simone Castellani, Rivalta di Torino (IT); Federico Dellavalle, Rivalta di Torino (IT); Felice Felippone, Rivalta di Torino (IT)

(73) Assignee: GE AVIO S.R.L., Rivalta di Torino (IT)

( * ) Notice: Subject to any disclaimer, the term of this patent is extended or adjusted under 35 U.S.C. 154(b) by 361 days.

(21) Appl. No.: 16/019,944

(22) Filed: Jun. 27, 2018

(65) Prior Publication Data

US 2019/0032577 A1 Jan. 31, 2019

(30) Foreign Application Priority Data

Jul. 28, 2017 (EP) .................................... 17425084

(51) Int. Cl.
*F02C 9/26* (2006.01)
*F02C 9/56* (2006.01)
(Continued)

(52) U.S. Cl.
CPC ................ *F02C 9/56* (2013.01); *B64C 11/30* (2013.01); *B64D 31/06* (2013.01); *B64D 37/00* (2013.01);
(Continued)

(58) Field of Classification Search
None
See application file for complete search history.

(56) References Cited

U.S. PATENT DOCUMENTS 5,023,793 A 6/1991 Schneider et al.
5,315,819 A 5/1994 Page et al.
(Continued)

FOREIGN PATENT DOCUMENTS

CN 1046988 A 11/1990
CN 1560452 A 1/2005

OTHER PUBLICATIONS

Prevallet, L. C. Single Lever Power Management of Turboprop Engines. No. 912200. SAE Technical Paper, 1991. (Year: 1991).*
(Continued)

*Primary Examiner* — Gerald L Sung
*Assistant Examiner* — Marc J Amar
(74) *Attorney, Agent, or Firm* — Dority & Manning, P.A.

(57) ABSTRACT

The present disclosure is directed to a system for controlling an output of a gas generator via an operator manipulated input device. The system includes one or more sensors measuring one or more environmental conditions, a gas generator shaft speed, and a power turbine torque. The system further includes an operator manipulated input device and one or more controllers including one or more processors and one or more memory devices. The one or more memory devices stores instructions that when executed by the one or more processors cause the one or more processors to perform operations. The operations include receiving, via an operator manipulated input device, a throttle lever position defining at least an idle position, a takeoff position, and one or more intermediate positions therebetween; receiving, via one or more sensors, one or more environmental conditions, wherein the environmental condition includes one or more of an ambient air temperature, an ambient air pressure, and an ambient airflow rate; determining, via the controller, a first commanded fuel flow of the gas generator based on a gas generator speed output
(Continued)

curve based at least on the throttle lever position, the one or more environmental conditions, and a coefficient reference table; determining, via the controller, a second commanded fuel flow of the gas generator based on a power turbine torque output curve based at least on the one or more environmental conditions; and generating, via the gas generator, a gas generator output based on the first commanded fuel flow or the second commanded fuel flow.

15 Claims, 11 Drawing Sheets

(51) Int. Cl.
  *B64D 31/06* (2006.01)
  *B64C 11/30* (2006.01)
  *B64D 37/00* (2006.01)
  *F02C 9/28* (2006.01)
  *F02C 9/00* (2006.01)
  *F02C 9/44* (2006.01)

(52) U.S. Cl.
  CPC ............ *F02C 9/00* (2013.01); *F02C 9/28* (2013.01); *F02C 9/44* (2013.01); *F05D 2270/02* (2013.01); *F05D 2270/05* (2013.01); *F05D 2270/052* (2013.01); *F05D 2270/304* (2013.01); *F05D 2270/335* (2013.01); *F05D 2270/58* (2013.01); *F05D 2270/708* (2013.01)

(56) References Cited

U.S. PATENT DOCUMENTS

| | | | |
|---|---|---|---|
| 5,775,090 A * | 7/1998 | Skarvan | F02C 9/28 60/39.282 |
| 6,321,525 B1 * | 11/2001 | Rogers | F01D 17/06 60/39.281 |
| 6,340,289 B1 | 1/2002 | Vos et al. | |
| 8,651,811 B2 | 2/2014 | Danielson | |
| 9,415,877 B2 | 8/2016 | Nobelen et al. | |
| 9,567,095 B2 | 2/2017 | McCarthy et al. | |
| 1,004,056 A1 | 8/2018 | Looper et al. | |
| 2010/0018182 A1 | 1/2010 | Bader et al. | |
| 2010/0241331 A1 | 9/2010 | Duke et al. | |
| 2011/0208400 A1 * | 8/2011 | Lickfold | B64D 31/06 701/100 |
| 2015/0113996 A1 * | 4/2015 | Cai | F02C 9/54 60/773 |
| 2016/0208717 A1 * | 7/2016 | Cai | F02C 9/54 |
| 2017/0036773 A1 | 2/2017 | Jones et al. | |
| 2017/0036774 A1 | 2/2017 | Nobelen | |
| 2017/0081038 A1 * | 3/2017 | Looper | B64C 11/34 |
| 2017/0107914 A1 | 4/2017 | Lu et al. | |

OTHER PUBLICATIONS

Prevallet, Single Lever Power Management of Turboprop Engines, SAE International Technical Paper 912200, Sep. 1, 1991, 9 Pages. (Abstract Only) http://papers.sae.org/912200/.

Extended European Search Report and Opinion issued in connection with corresponding EP Application No. 17425084.5 dated Jan. 26, 2018.

Combined Chinese Office Action and Search Report Corresponding to Application No. 201810843934 dated Jul. 27, 2020.

* cited by examiner

METHOD OF CONTROLLING GAS GENERATOR POWER AND TORQUE OUTPUT

FIELD

The present subject matter relates generally to gas turbine engines used for aircraft.

BACKGROUND

Gas turbine engines such as turboprop engines generally include at least two operator manipulated input devices; a power lever for controlling a commanded power output of the engine, a condition lever for controlling fuel cut-off and manually setting a ground idle or flight idle setting of the gas turbine engine, and a propeller lever for controlling propeller pitch angle and propeller speed.

As control of the engine transitions from a ground idle condition to a maximum power or takeoff condition, interruptions may occur in the relationship between the throttle lever position versus the commanded power output of the gas generator that may reduce engine operation or performance. Furthermore, such interruptions or irregularities in the engine condition transition may burden control of the propeller assembly such as to mitigate effective or efficient control of the propeller assembly via the throttle lever position. Transitions or changes in engine operating condition across the flight envelop generally requires manual changes or inputs, thus further burdening control of the propeller assembly and reducing efficient control.

As such, there is a need for an engine control system and method of operation that removes such burdens and mitigates or eliminates interruptions or irregularities in the engine condition transition from idle condition to maximum power. Still further, there is a need for an engine control system and method of operation that may reduce quantities of stored data or memory usage when removing the aforementioned burdens and interruptions.

BRIEF DESCRIPTION

Aspects and advantages of the invention will be set forth in part in the following description, or can be apparent from the description, or can be learned through practice of the invention.

The present disclosure is directed to a system for controlling an output of a gas generator via an operator manipulated input device. The system includes one or more sensors measuring one or more environmental conditions, a gas generator shaft speed, and a power turbine torque. The system further includes an operator manipulated input device and one or more controllers including one or more processors and one or more memory devices. The one or more memory devices stores instructions that when executed by the one or more processors cause the one or more processors to perform operations. The operations include receiving, via the operator manipulated input device, a throttle lever position defining at least an idle position, a takeoff position, and one or more intermediate positions therebetween; receiving, via one or more sensors, one or more environmental conditions, wherein the environmental condition includes one or more of an ambient air temperature, an ambient air pressure, and an ambient airflow rate; determining, via the controller, a first commanded fuel flow of the gas generator based on a gas generator speed output curve based at least on the throttle lever position, the one or more environmental conditions, and a coefficient reference table; determining, via the controller, a second commanded fuel flow of the gas generator based on a power turbine torque output curve based at least on the one or more environmental conditions; and generating, via the gas generator, a gas generator output based on the first commanded fuel flow or the second commanded fuel flow.

In various embodiments, generating the gas generator output includes generating a gas generator shaft speed based on the first commanded fuel flow or a power turbine torque based on the second commanded fuel flow. In still various embodiments, the operations further include determining, via the controller, whether to generate the gas generator output based on the gas generator shaft speed or the power turbine torque is based at least on a measurement accuracy of the one or more sensors measuring a power turbine torque. In one embodiment, if the one or more sensors measuring the power turbine torque is beyond a predetermined accuracy threshold then the gas generator output is based on the first commanded fuel flow. In another embodiment, determining whether to generate the gas generator output based on the gas generator shaft speed or the power turbine torque includes comparing, via the controller, the first commanded fuel flow and the second commanded fuel flow at the throttle lever position defining one or more intermediate positions; and generating, via the gas generator, the gas generator output based on the lesser of the first commanded fuel flow and the second commanded fuel flow at the one or more intermediate positions of the throttle lever position.

In various embodiments of the system, determining a first commanded fuel flow of the gas generator based on a gas generator speed output curve further includes generating, via the controller, the gas generator speed output curve based at least on a target gas generator shaft speed curve and a gas generator power output curve, the target gas generator shaft speed curve based at least on the throttle lever position, the one or more environmental conditions, and the coefficient reference table comprising one or more arrays of coefficients versus one or more throttle lever positions. In one embodiment, generating the gas generator speed output curve includes calculating, via the controller, a normalized gas generator shaft speed via a first array of coefficients based on the throttle lever position and a function of the one or more environmental conditions and the first array of coefficients.

In still various embodiments, generating the gas generator output curve further includes calculating, via the controller, a first gas generator shaft speed based on a first reference curve, the first reference curve based on a predetermined first gas generator speed and the one or more environmental conditions; calculating, via the controller, a second gas generator shaft speed based on a second reference curve, the second reference curve based on a predetermined second gas generator speed and the one or more environmental conditions; and calculating, via the controller, the target gas generator shaft speed based on the normalized gas generator shaft speed, the first gas generator shaft speed, and the second gas generator shaft speed.

In one embodiment, the first reference curve defines a lookup table, a curve, or an equation comprising one or more of the first gas generator shaft speed versus one or more of the environmental conditions. In another embodiment, the second reference curve defines a lookup table, a curve, or an equation comprising one or more of the second gas generator shaft speed versus one or more of the environmental conditions.

In still another embodiment, generating the gas generator output curve further includes determining, via the controller, a first constant based at least partially on a function of the second gas generator shaft speed and the first gas generator shaft speed. In one embodiment, generating the gas generator output curve is based at least partially on a function of the normalized gas generator shaft speed, the first constant, and the first gas generator shaft speed.

In still another embodiment of the system, the operations further include receiving, via one or more sensors, a measured propeller speed; determining, via the controller, a commanded propeller pitch angle based at least on the measured propeller speed; and adjusting, via the propeller assembly, the propeller speed based at least on the commanded propeller pitch angle.

The present disclosure is further directed to a method of controlling power and torque output of a gas generator and propeller assembly for an aircraft. The method includes determining a first commanded fuel flow of the gas generator based on a gas generator speed output curve based at least on a throttle lever position, one or more environmental conditions, and a coefficient reference table; determining a second commanded fuel flow of the gas generator based on a power turbine torque output curve based at least on the one or more environmental conditions; and generating a gas generator output based on the first commanded fuel flow or the second commanded fuel flow.

In one embodiment, the method further includes determining whether to generate the gas generator shaft speed or the power turbine torque based at least on a measurement accuracy of one or more sensors measuring a power turbine torque.

In various embodiments, determining whether to generate the gas generator output based on the gas generator shaft speed or the power turbine torque includes comparing the first commanded fuel flow and the second commanded fuel flow at the throttle lever position defining one or more intermediate positions; and generating the gas generator output based on the lesser of the first commanded fuel flow and the second commanded fuel flow at the one or more intermediate positions of the throttle lever position.

In one embodiment of the method, determining a first commanded fuel flow of the gas generator based on a gas generator speed output curve further includes generating the gas generator speed output curve based at least on a target gas generator shaft speed curve and a gas generator power output curve, the target gas generator shaft speed curve based at least on the throttle lever position, the one or more environmental conditions, and the coefficient reference table comprising one or more arrays of coefficients versus one or more throttle lever positions.

In another embodiment, generating the gas generator speed output curve includes calculating a normalized gas generator shaft speed via a first array of coefficients based on the throttle lever position and a function of the one or more environmental conditions and the first array of coefficients.

In still another embodiment, generating the gas generator output curve further includes calculating a first gas generator shaft speed based on a first reference curve, the first reference curve based on a predetermined first gas generator speed and the one or more environmental conditions; calculating a second gas generator shaft speed based on a second reference curve, the second reference curve based on a predetermined second gas generator speed and the one or more environmental conditions; and calculating the target gas generator shaft speed based on the normalized gas generator shaft speed, the first gas generator shaft speed, and the second gas generator shaft speed.

In still yet another embodiment, the method further includes determining a commanded propeller pitch angle based at least on a measured propeller speed; and adjusting the measured propeller speed based at least on the commanded propeller pitch angle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
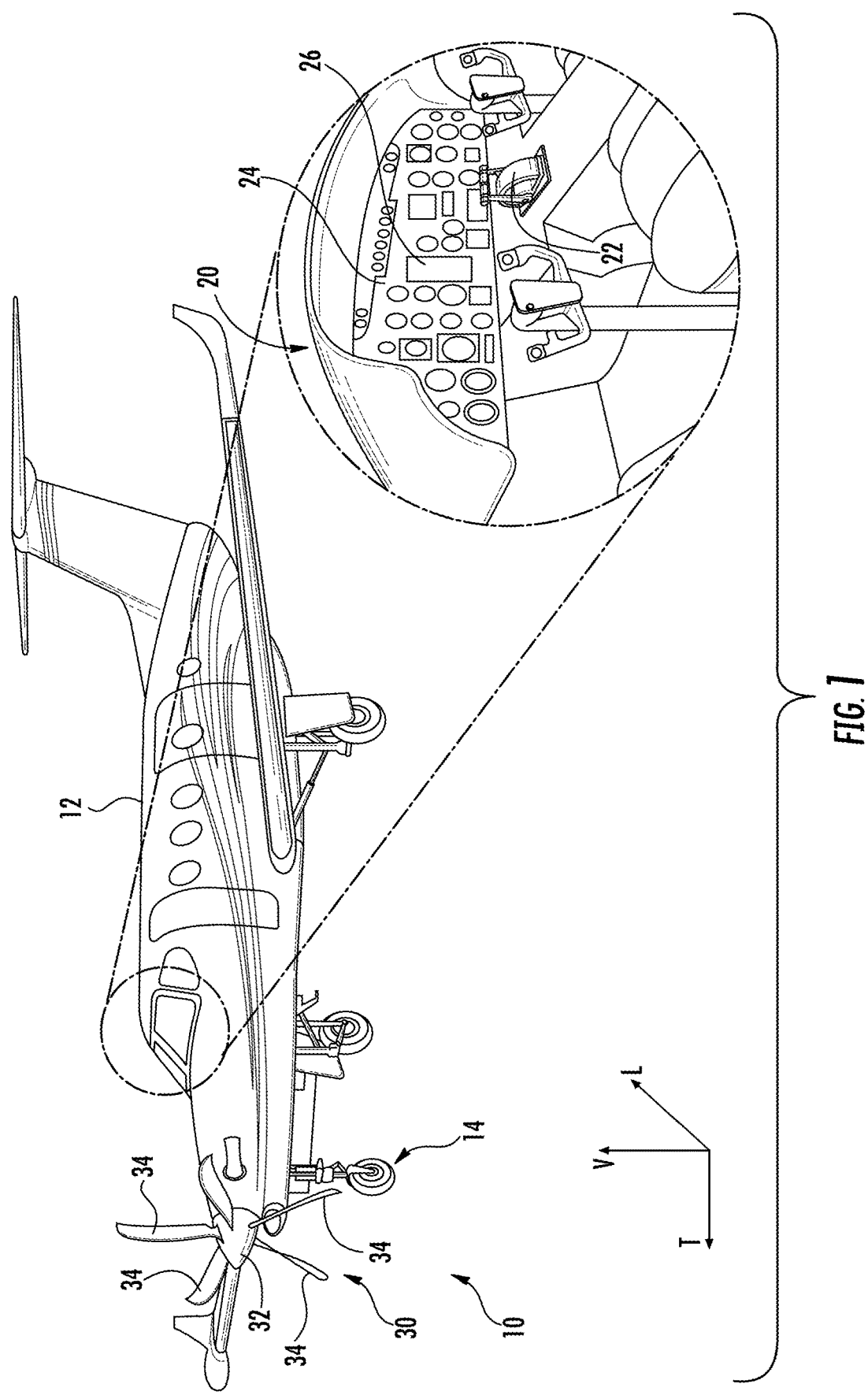
FIG. 1 illustrates a perspective view of an aircraft according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", "third", "fourth", and "fifth" can be used interchangeably to distinguish one component from another and are not intended to signify location or importance of the individual components. In addition, the term "restore" means returning a signal or logic to a former condition or original state.

Embodiments of systems and methods of controlling a torque and speed output of an engine including a gas generator and propeller assembly is generally provided. The systems and methods of operation generally provided may scale and re-scale a relationship of a throttle lever position (e.g., power level angle or PLA) versus torque or speed output such as to provide automatic control of the engine across the flight envelope (i.e., remove manual inputs or changes). Furthermore, the systems and methods provided herein may provide an optimized relationship of the throttle lever position and the torque or speed output regardless of engine operability or age (e.g., regardless of accumulated hours, cycles, wear, etc.). The systems and methods provided herein may control the gas generator and propeller assembly to mitigate or eliminate interruptions or irregularities in changes to torque or speed output from idle condition to maximum power. The systems and methods generally provided may further reduce manual operation complexity, thereby increasing efficiency, performance, and safety, and reducing cost and fuel consumption, by providing a single throttle lever position input to control gas generator output and propeller assembly speed.

Referring now to the drawings, FIG. 1 provides a perspective view of an exemplary aircraft 10 in accordance with example embodiments of the present disclosure. The aircraft 10 defines an orthogonal coordinate system, including three orthogonal coordinate axes. In particular, the three orthogonal coordinate axes include a lateral axis L, a longitudinal axis T, and a vertical axis V. In operation, the aircraft 10 can move along at least one of the lateral axis L, the longitudinal axis T, and the vertical axis V.

Figure 3:
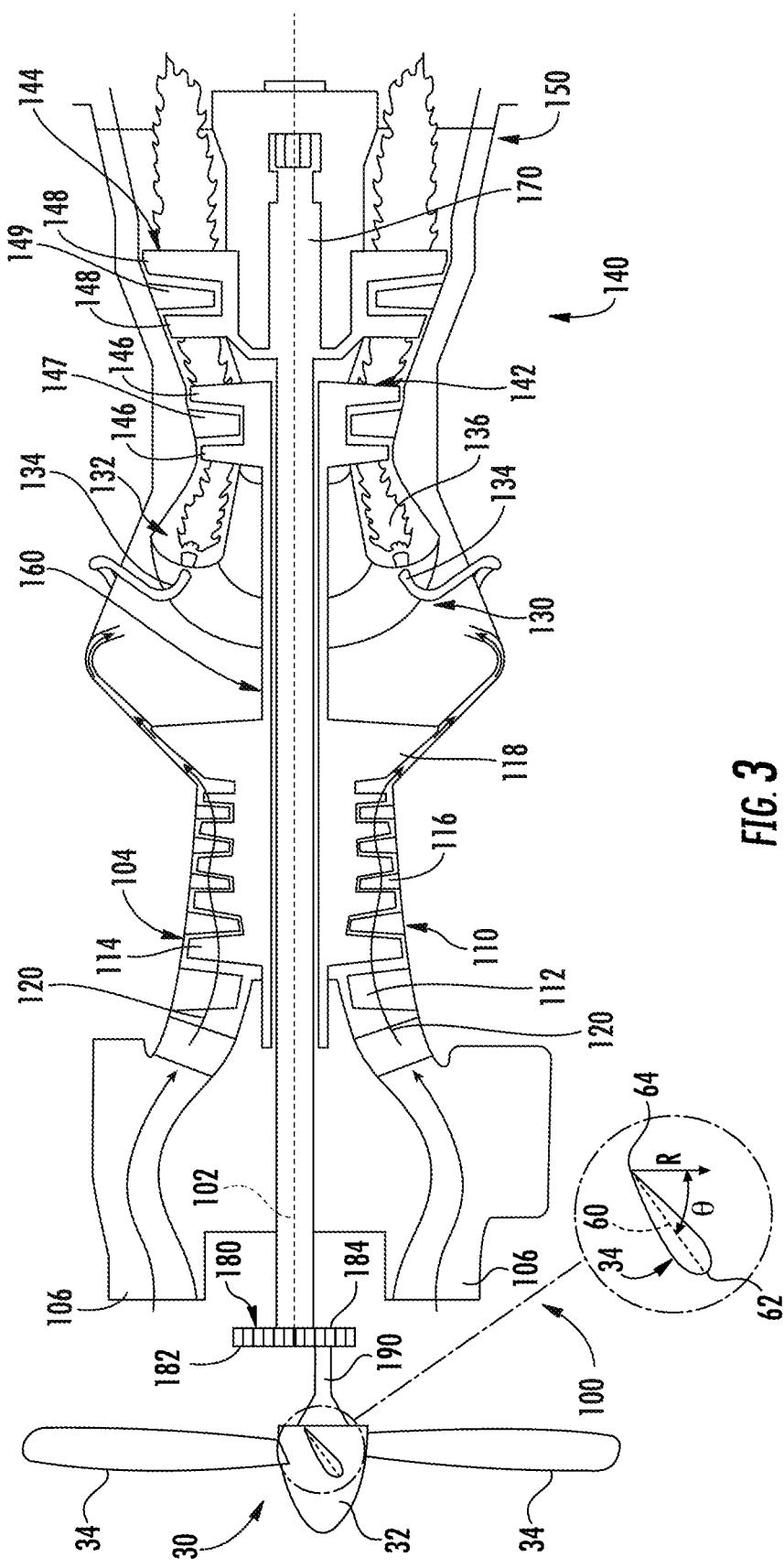
FIG. 3 illustrates a schematic cross-sectional view of a gas turbine engine according to example embodiments of the present disclosure.

In the example embodiment of FIG. 1, the aircraft 10 includes an airframe 12 defining a cockpit 20. The cockpit 20 includes a throttle input device 22 and an instrument control panel 24 having a display 26. The aircraft 10 further includes a propeller assembly 30 comprising a hub 32 and a plurality of blades 34 extending outwardly from the hub 32. Additionally, the aircraft 10 includes a gas generator 100 (FIG. 3). The gas generator 100 generates and transmits power to drive rotation of the propeller assembly 30. In particular, rotation of the propeller assembly 30 generates thrust for the aircraft 10.

Figure 2:
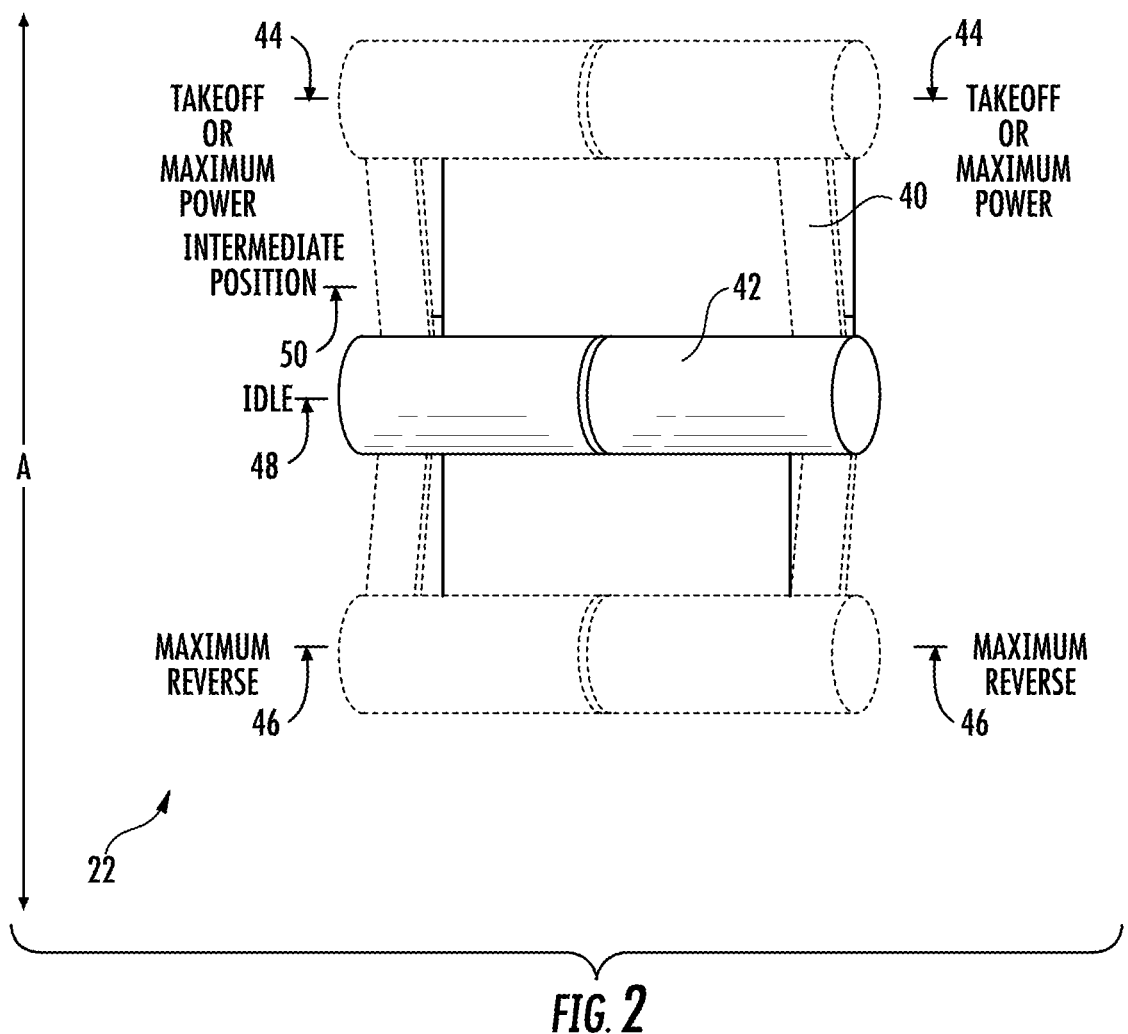
FIG. 2 illustrates a top-down view of a throttle input device according to example embodiments of the present disclosure.

Referring now to FIG. 2, the throttle input device 22 controls engine power of the gas generator 100. Furthermore, the throttle input device 22 (e.g., defining a power level angle or PLA, or thrust level angle TLA, etc.) is more generally an operator manipulated input device. Independent control of output torque and output speed of the gas generator 100 and the propeller assembly 30 are each a function of the throttle input device 22. In the embodiment depicted, the throttle input device 22 defines an axial direction A, and the throttle input device 22 includes a lever 40 having a handle 42. As shown, the lever 40 is movable between one or more throttle lever positions, such as a first position 44 and a second position 46 along the axial direction A. Accordingly, moving the lever 40 to the first position 44 increases thrust of the aircraft 10 (FIG. 1) in a first direction along the longitudinal axis T. In contrast, moving the lever 40 to the second position 46 increases thrust of the aircraft 10 in a second direction along the longitudinal axis T. It should be appreciated that the first direction is opposite the second direction along the longitudinal axis T.

In the example embodiment depicted, the first position 44 corresponds to a TAKEOFF or MAXIMUM POWER setting (hereinafter referred to as "TAKEOFF" or "TO") of the gas generator 100, and the second position 46 corresponds to a MAXIMUM REVERSE setting of the gas generator 100. In addition, the throttle input device 22 includes an IDLE position 48, as well as one or more of intermediate third positions 50 disposed between the first and second positions 44, 46. More specifically, the intermediate third positions 50 can include a MAX CRUISE position and a MAX CLIMB position.

Referring now to FIG. 3, the gas generator 100 defines a longitudinal or centerline axis 102 extending therethrough for reference. The gas generator 100 can generally include a substantially tubular outer casing 104 that defines an annular inlet 106. The outer casing 104 can be formed from a single casing or multiple casings. The outer casing 104 encloses, in serial flow relationship, a gas generator compressor 110, a combustion section 130, a turbine section 140, and an exhaust section 150. The gas generator compressor 110 includes an annular array of inlet guide vanes 112, one or more sequential stages of compressor blades 114, one or more sequential stages of stationary and/or variable guide vanes 116, and a centrifugal compressor 118. Collectively, the compressor blades 114, vanes 116, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor 110 and the turbine section 140.

The turbine section 140 includes a gas generator turbine 142 and a power turbine 144. The gas generator turbine 142 includes one or more sequential stages of turbine rotor blades 146 and one or more sequential stages of stator vanes 147. Likewise, the power turbine 144 includes one or more sequential stages of turbine rotor blades 148 and one or more sequential stages of stator vanes 149. Additionally, the gas generator turbine 142 drives the gas generator compressor 110 via a gas generator shaft 160, and the power turbine 144 drives the propeller assembly 30 via a power turbine shaft 170.

More specifically, as shown in the embodiment illustrated in FIG. 3, the gas generator compressor 110 and the gas generator turbine 142 are coupled to one another via the gas generator shaft 160, and the power turbine 144 and the propeller assembly 30 are coupled to one another via the power turbine shaft 170. In operation, the combustion gases 136 drive both the gas generator turbine 142 and the power turbine 144. As the gas generator turbine 142 rotates around the centerline axis 102, the gas generator compressor 110 and the gas generator shaft 160 both also rotate around the centerline axis 102. Further, as the power turbine 144 rotates, the power turbine shaft 170 rotates and transfers rotational energy to the propeller assembly 30 through a gear train 180. More specifically, the gear train 180 can include a first gear 182 and a second gear 184 in mesh with the first gear 182. The first gear 182 can be connected to the power turbine shaft 170, and the second gear 184 can be connected to a propeller shaft 190. In operation, the gear train 180 can step-down a rotational speed $N_P$ of the power turbine shaft 170. Accordingly, a rotational speed $N_R$ of the propeller shaft 190 can be less than the rotational speed $N_P$ of the power turbine shaft 170.

As shown, the propeller assembly 30 can be rotatably coupled to the propeller shaft 190, and the plurality of blades 34 can be rotatable about a direction R. In addition, each blade of the plurality of blades 34 defines a pitch angle θ between the direction R and a chord 60 extending between leading and trailing edges 62, 64 of each blade.

Figure 4:
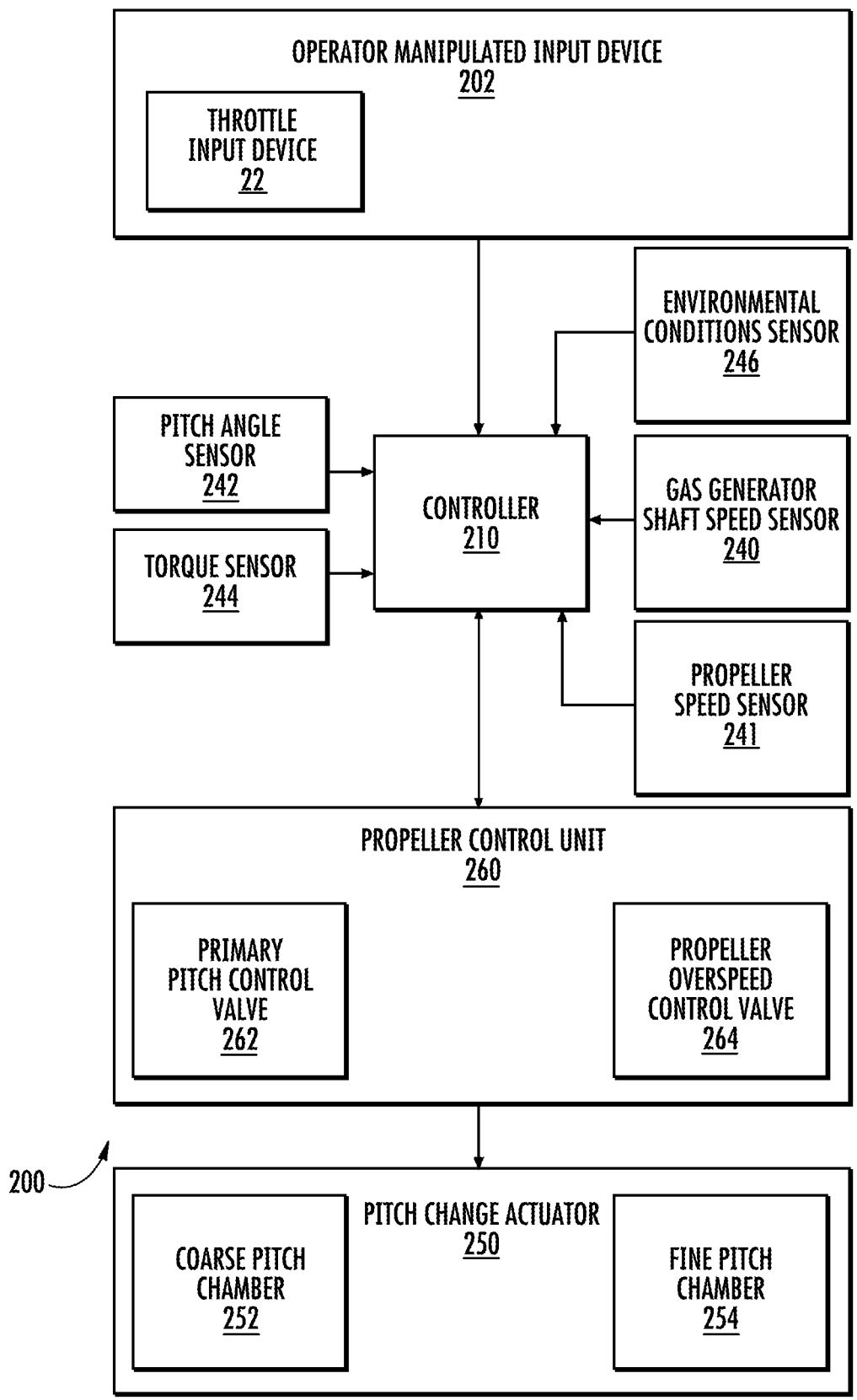
FIG. 4 illustrates a schematic view of a system for control logic for a propeller according to example embodiments of the present disclosure.

Referring now to FIG. 4, an example embodiment of a system 200 for setting a minimum pitch angle setting for the propeller assembly 30 and a minimum gas generator idle speed for the gas generator 100 of the aircraft 10 is illustrated in accordance with aspects of the present disclosure. In general, the system 200 will be described with reference to the aircraft 10, the throttle input device 22, and the gas generator 100 described above with reference to FIGS. 1, 2 and 3, respectively. However, in other embodiments, the system 200 can be implemented or used in association with any other suitable aircraft 10 or throttle input device 22.

As shown in FIG. 4, the system 200 can include an operator manipulated input device 202. In one embodiment, the operator manipulated device 202 can include the throttle input device 22 (FIG. 1). As will be discussed below in more detail, an operator of the aircraft 10 can use the operator manipulated input device 202, or more specifically, the single throttle input device 22 relative to each gas generator 100, to provide an approximately linear relationship between throttle lever position from the throttle input device 22 and propeller assembly output power.

Figure 5:
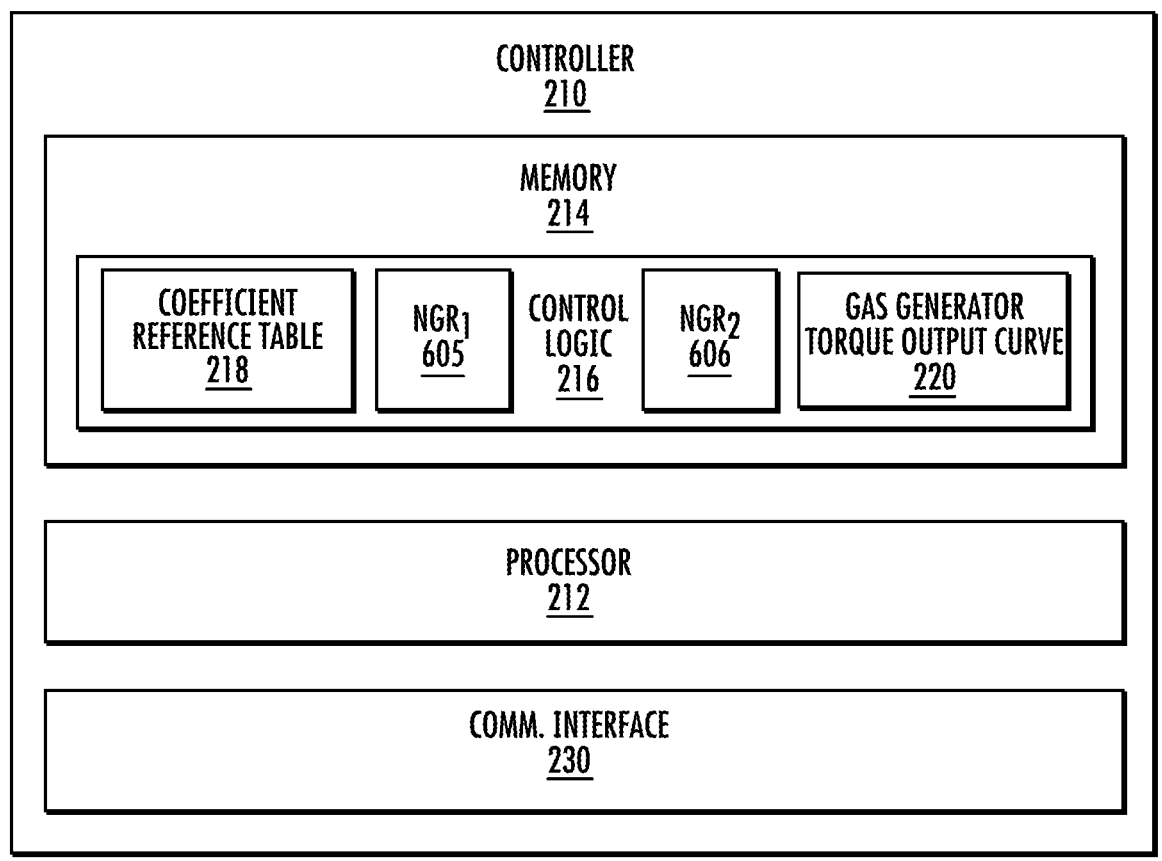
FIG. 5 illustrates a block diagram of one embodiment of a controller according to example embodiments of the present disclosure.

The system 200 can also include a controller 210. In general, the controller 210 can correspond to any suitable processor-based device, including one or more computing devices. For instance, FIG. 5 illustrates one embodiment of suitable components that can be included within the controller 210. As shown in FIG. 5, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 can include control logic 216 stored in memory 214. In addition, the control logic 216 can include a coefficient reference table 218 and a power turbine torque output curve 220. The coefficient reference table 218 is stored in the memory 214 as one or more of a table, curve, or function and is referenced when determining a first commanded fuel flow at the gas generator 100 to output a desired gas generator shaft speed. The power turbine torque output curve 220 is stored in the memory 214 as one or more of a table, curve, or function and is referenced when determining a second commanded fuel flow at the gas generator 100 to output a desired power turbine output torque.

The coefficient reference table 218 may enable a reduction in memory storage (e.g. memory 214 of the controller 210) while enabling linear variation of the power output with the throttle lever position. For example, the coefficient reference table 218 enables utilizing shape coefficients rather than pluralities of discrete table outputs that may occupy relatively large quantities of memory storage. As such, the coefficient reference table 218 may enable relatively small quantities of memory storage.

Furthermore, the controller 210 may further include a first reference curve ($NGR_1$) 605 and a second reference curve ($NGR_2$) 606, in which each curve 605, 606 defines one or more predetermined gas generator speeds as further described below herein.

Additionally, as shown in FIG. 5, the controller 210 can also include a communications interface module 230. In several embodiments, the communications interface module 230 can include associated electronic circuitry that is used to send and receive data. As such, the communications interface module 230 of the controller 210 can be used to receive data from the operator manipulated input device 202. In addition, the communications interface module 230 can also be used to communicate with any other suitable components of the gas generator 100, including any number of sensors (e.g., sensors 240, 241, 242, 244, 246 shown in FIG. 4) configured to monitor one or more operating parameters of the gas generator 100 and/or the propeller assembly 30. It should be appreciated that the communications interface module 230 can be any combination of suitable wired and/or wireless communications interfaces and, thus, can be communicatively coupled to one or more components of the gas generator 100 via a wired and/or wireless connection.

Referring again to FIG. 4, the system 200 includes a gas generator shaft speed sensor 240 operable to detect or measure the rotational speed NGR of the gas generator shaft 160. The system 200 may further include a propeller speed sensor 241 operable to detect or measure the rotational speed $N_P$ of the power turbine shaft 170 or rotational speed $N_R$ of the propeller shaft 190. The system 200 may still further include a torque sensor 244 operable to detect or measure an output torque of the gas generator 100 from the gas generator shaft 160.

The system 200 further includes one or more environmental conditions sensors 246 operable to detect or measure one or more environmental conditions. The environmental conditions include ambient air conditions, including temperature, pressure, and air speed. In various embodiments, the sensors 246 detect or measure a change in international standard atmosphere (ISA), such as one or more of temperature, pressure, density, and viscosity of ambient air based on a change in altitude.

The system 200 can also include a pitch angle sensor 242 operable to detect or measure the pitch angle θ of each blade of the plurality of blades 34. It should be appreciated that each speed sensor 240, 241 and the pitch angle sensor 242 can be communicatively coupled to the controller 210 via any suitable wired or wireless connection.

Referring still to FIG. 4, it should be appreciated that the sensor 244 can be communicatively coupled to the controller 210 via any suitable wired or wireless connection. As such, in one example embodiment, the controller 210 can receive a signal from the sensor 244 indicating whether the aircraft 10 is operating IDLE, MAX CRUISE, MAX CLIMB, or MAX TAKEOFF conditions.

The system 200 of FIG. 4 can include a pitch change actuator 250 comprising a coarse pitch chamber 252 and a fine pitch chamber 254. A fluid (e.g., hydraulic fluid, engine oil, etc.) can be directed into or out of the coarse pitch chamber 252 to simultaneously increase the pitch angle θ of each blade of the plurality of blades 34. In contrast, the fluid can be directed into or out of the fine pitch chamber 254 to simultaneously decrease the pitch angle θ of each blade of the plurality of blades 34.

The system 200 can also include a propeller control unit 260 that is communicatively coupled to the controller 210. As shown, the propeller control unit 260 can include a primary pitch control valve 262 and a propeller overspeed control valve 264. In operation, the propeller control unit 260 can receive one or more commands from the controller 210 to adjust the pitch angle θ of the blades 34 via the primary pitch control valve 262. In one example embodiment, the propeller control unit 260 can operate the primary pitch control valve 262 to direct the fluid into or out of the fine pitch chamber 254. Alternatively, or in addition to, the propeller control unit 260 can operate the primary pitch control valve 262 to direct the fluid into or out of the coarse pitch chamber 252.

It should be appreciated that the primary pitch control valve 262 can be used to adjust the pitch angle θ of each blade of the plurality of blades 34 when the rotational speed of the propeller assembly 30 is operating at a normal operating condition. For example, the normal operating condition may be when a propeller speed of the propeller assembly 30 is approximately at a target value scheduled by the controller 210 (e.g., a FADEC).

Figure 6:
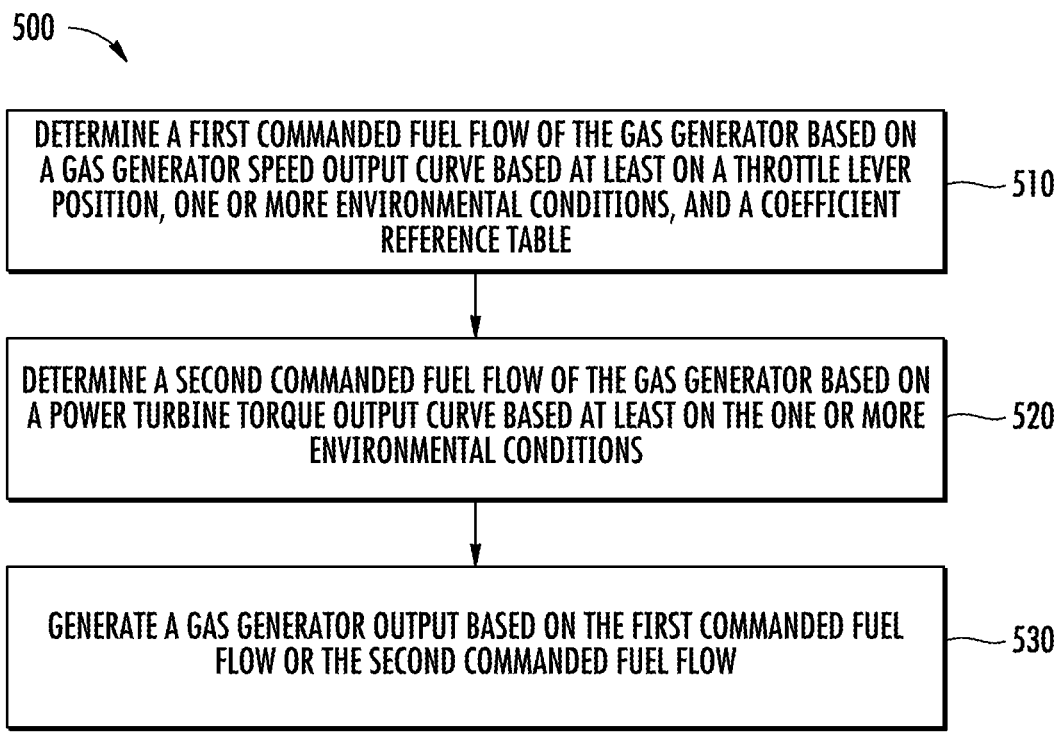
FIG. 6 is a flowchart outlining exemplary steps of a method of operating a gas generator and propeller assembly according to an embodiment of the present disclosure.
Figure 7:
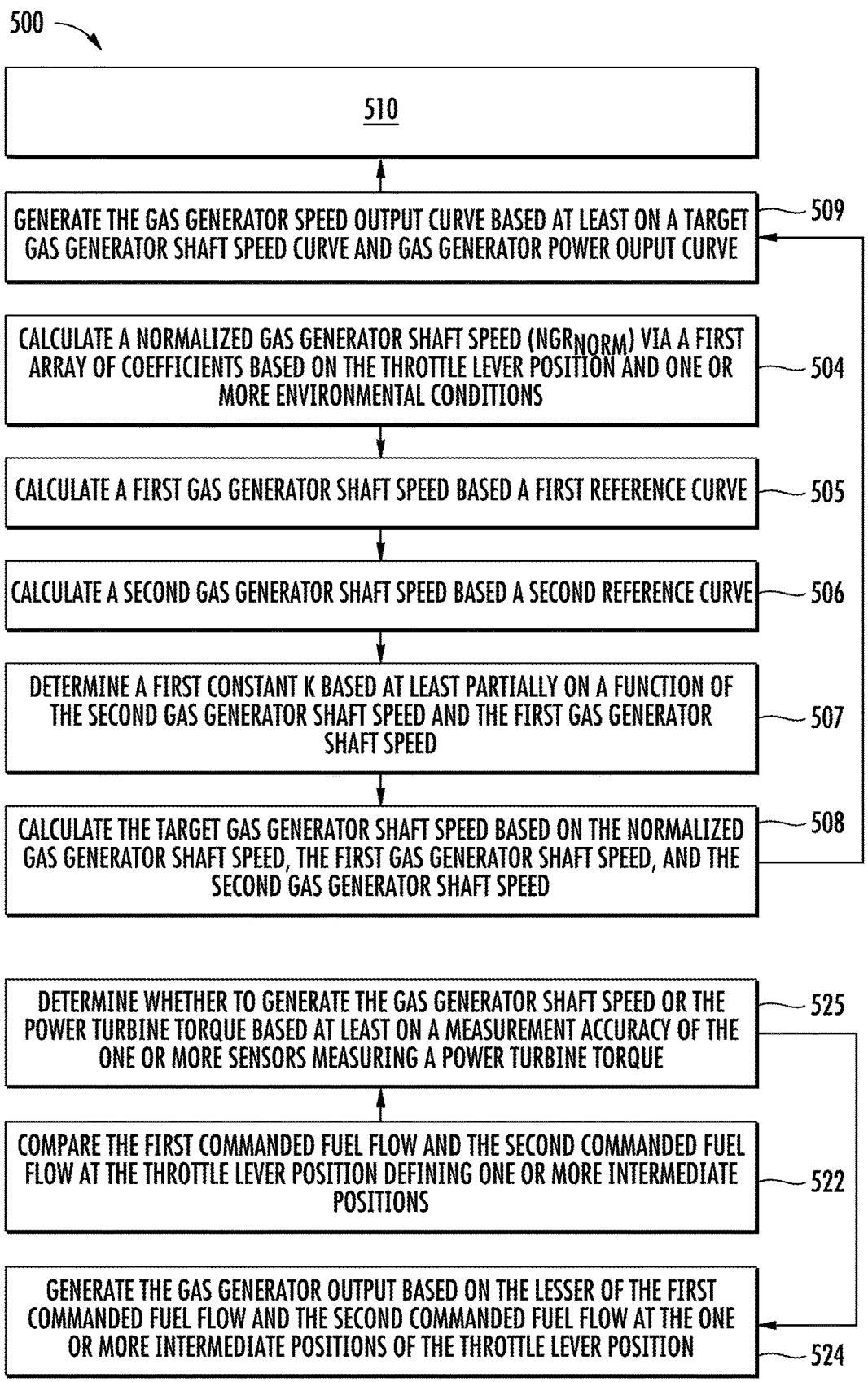
FIG. 7 is a flowchart further outlining exemplary steps of a method of operating a gas generator and propeller assembly according to an embodiment of the present disclosure.
Figure 8:
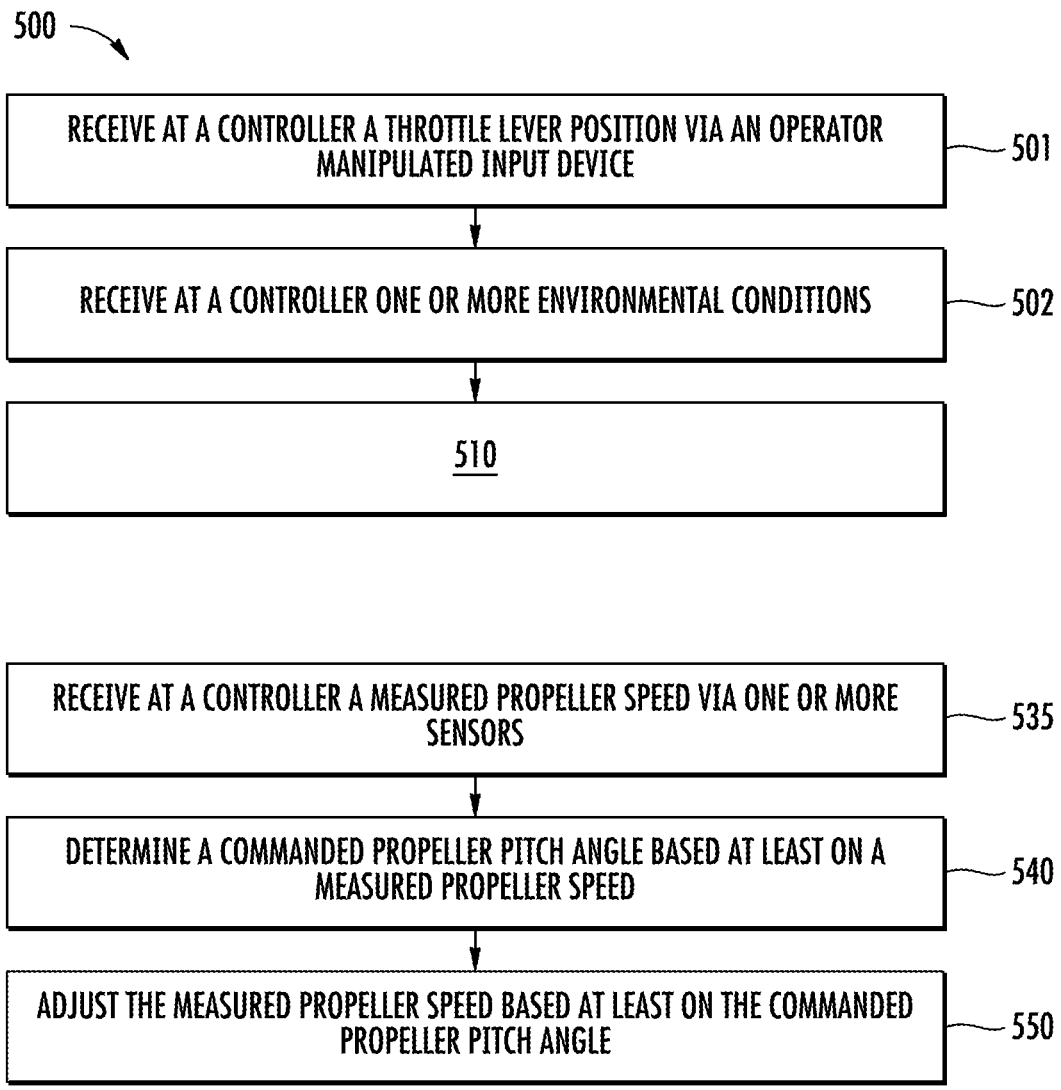
FIG. 8 is a flowchart still further outlining exemplary steps of a method of operating a gas generator and propeller assembly according to an embodiment of the present disclosure.

Referring now to FIGS. 6-8, a flowchart outlining exemplary steps of a method of controlling a gas generator and propeller assembly for an aircraft 500 (hereinafter, "method 500") are generally provided. The method 500 may be implemented in a system including a gas generator and a propeller assembly each controlled by one or more computing devices, such as the aircraft 10, the gas generator 100, the propeller assembly 30, and the controller 210 generally shown and described in regard to FIGS. 1-5. Although the method 500 includes steps provided in a particular order herein, in should be appreciated that the steps may be re-arranged, re-ordered, or omitted without deviating from the scope of the present disclosure.

The method 500 includes (see FIG. 6) at 510 determining a first commanded fuel flow of the gas generator based on a gas generator speed output curve based at least on a throttle lever position, one or more environmental conditions, and a coefficient reference table; at 520 determining a second commanded fuel flow of the gas generator based on a power turbine torque output curve based at least on the one or more environmental conditions; and at 530 generating a gas generator output based on the first commanded fuel flow or the second commanded fuel flow.

In various embodiments, the method 500 further includes (see FIG. 8) at 501 receiving at a controller (e.g., controller 210) a throttle lever position via an operator manipulated input device (e.g., the operator manipulated input device 202). As shown and described in regard to FIG. 2, the operator manipulated input device 202 defines at least an idle position 48, a takeoff position 44, and one or more intermediate positions 50 therebetween. The method 500 further includes at 502 receiving at a controller one or more environmental conditions. The environmental conditions include one or more of an ambient air temperature, an ambient air pressure, and an ambient airflow rate (e.g., Mach number, aircraft airspeed measurement or calculation, etc.).

At 530, generating the gas generator output comprises generating a gas generator shaft speed based on the first commanded fuel flow or a power turbine torque based on the second commanded fuel flow. For example, as generally provided in the flowchart in FIG. 9, the gas generator 100 produces an output torque and an output speed (e.g., NGR measured) based on the combustion of fuel and air as generally described in regard to the exemplary embodiment of the gas generator 100 provided in FIG. 3.

In various embodiments, the method 500 further includes (see FIG. 7) at 525 determining whether to generate the gas generator shaft speed or the power turbine torque based at least on a measurement accuracy of the one or more sensors measuring a power turbine torque. For example, referring to FIGS. 1-8, the one or more sensors measuring power turbine torque may include the torque sensor 244. The torque sensor 244 may generally define a measurement accuracy. In various embodiments, the measurement accuracy is based on a percentage of the reading or measurement (e.g., a percentage of the measured output torque). In other embodiments, the measurement accuracy is based on a percentage of the full scale of the measurement range.

In various embodiments of the method 500, determining whether to generate the gas generator output (e.g., gas generator shaft speed or power turbine torque) based on the first commanded fuel flow or the second commanded fuel flow is based at least on a predetermined accuracy threshold. For example, the predetermined accuracy threshold may be a range of measurements or point within the measurement range under which the torque sensor (e.g., torque sensor 244) is considered undesirably accurate, such as in contrast to the speed sensor (e.g., speed sensor 240). If the torque sensor is beyond a predetermined accuracy threshold then the gas generator output is based on the first commanded fuel flow (i.e., generating the gas generator output at 530 is based on the first commanded fuel flow determined at 510). If the torque sensor is within the predetermined accuracy threshold then the gas generator output is based on the second commanded fuel flow (i.e., generating the gas generator output at 530 is based on the second commanded fuel flow determined at 520). For example, in various embodiments, such as at generally low torque or low power conditions, the torque sensor may be beyond the predetermined accuracy threshold such that the gas generator output is based on the first commanded fuel flow.

In one embodiment of the method 500, determining the first commanded fuel flow at 510 and determining the second commanded fuel flow at 520 each occur at all throttle lever positions (e.g., the first position 44, the second position 46, the idle position 48, and the one or more intermediate positions 50). For example, each fuel flow determined in 510 and 520 is stored in the memory 214 of the controller 210 and is available if there is a failure of the sensors 240, 244.

However, in another embodiment of the method 500 at 525 (see FIG. 7), determining whether to generate the gas generator output based on the gas generator shaft speed or the power turbine torque includes at 522 comparing the first commanded fuel flow and the second commanded fuel flow at the throttle lever position defining one or more intermediate positions; and at 524 generating the gas generator output based on the lesser of the first commanded fuel flow and the second commanded fuel flow at the one or more intermediate positions of the throttle lever position.

For example, the predetermined accuracy threshold may define a range of readings or a scale, or a range of throttle lever positions (e.g., relative to a desired gas generator power output) at which the torque sensor 244 and the speed sensor 240 are at approximately similar measurement accuracies. The method 500 may therefore include at 522 comparing the first commanded fuel flow determined at 510 and the second commanded fuel flow determined at 520, and at 524 generating the gas generator output based on the lesser of the fuel flows determined at 510 and 520. The method 500 at 524 may include alternating from the first commanded fuel flow and the second commanded fuel flow while within the predetermined accuracy threshold or the one or more intermediate positions of the throttle lever position. For example, each sensor 240, 244 may produce fluctuations or noise within the predetermined accuracy threshold that may result in spikes, fluctuations, or oscillations in determined fuel flows if utilized to generate the gas generator output. As such, the method 500 at 524 generates the gas generator output based on the lesser of the determined fuel flows of 510 and 520 to mitigate or minimize undesired effects of such fluctuations.

Figure 9:
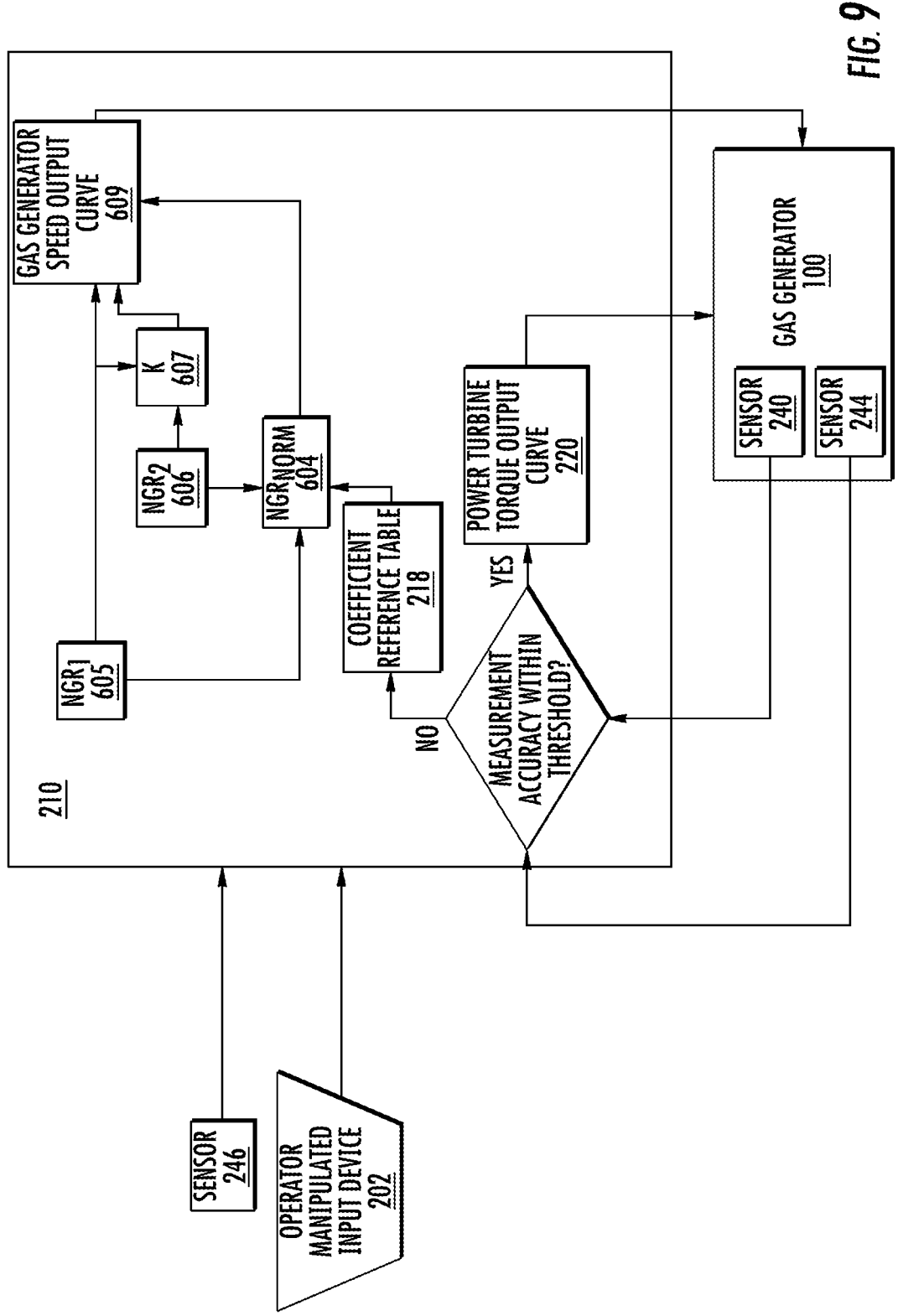
FIG. 9 is a flowchart schematic of a method of operating a gas generator and propeller assembly according to an embodiment of the present disclosure.

Referring now to FIG. 9, an exemplary flowchart schematic of the gas generator 100 and controller 210 is generally provided. A power turbine torque curve 220 is generally provided defining an output torque of the gas generator (e.g., gas generator 100) versus a change in the international standard atmosphere (ISA). The ISA is a function of one or more of the ambient pressure, temperature, density, and viscosity of ambient air over a plurality of altitudes. For example, as altitude increases, ambient pressure, temperature, density, and viscosity will alter. The power turbine torque curve 220 is a predetermined reference table, curve, or function based on a plurality of the known output torque at a plurality of ISA conditions. The power turbine torque curve 220 further defines a plurality of curves 805 based on changes in air speed, such as generally provided in FIG. 10. For example, increasing air speed defines the curve 805 at greater output torques. The controller 210 determines the second commanded fuel flow necessary to produce the output torque from the gas generator 100 based on the power turbine torque curve 220.

Referring now to exemplary embodiments of the method 500 at 510, the coefficient reference table 218 includes a plurality of arrays of coefficients versus the environmental conditions (e.g., ambient temperature, ambient pressure, air speed). In one embodiment, the coefficient reference table 218 defines two or more predetermined arrays or shape coefficients from which additional arrays or shape coefficients are interpolated. For example, the coefficient reference table 218 may define an array of coefficients corresponding to the throttle lever position at the second position 46 or at the IDLE position 48, and an array of coefficients corresponding to the throttle lever position at the first position 44 (e.g., MAXIMUM POWER or TAKEOFF) or at an intermediate position 50 (e.g., MAX CRUISE or MAX CLIMB). The controller 210 including the coefficient reference table 218 may interpolate another array of coefficients at the plurality of throttle lever positions between the first position and the second position.

In another embodiment at 510, determining a first commanded fuel flow of the gas generator based on a gas generator speed output curve further includes at 509 generating the gas generator speed output curve based at least on a target gas generator shaft speed curve and a gas generator power output curve. The target gas generator shaft speed curve is based at least on the throttle lever position, the one or more environmental conditions, and the coefficient reference table comprising one or more arrays of coefficients versus one or more throttle lever positions.

Figure 10:
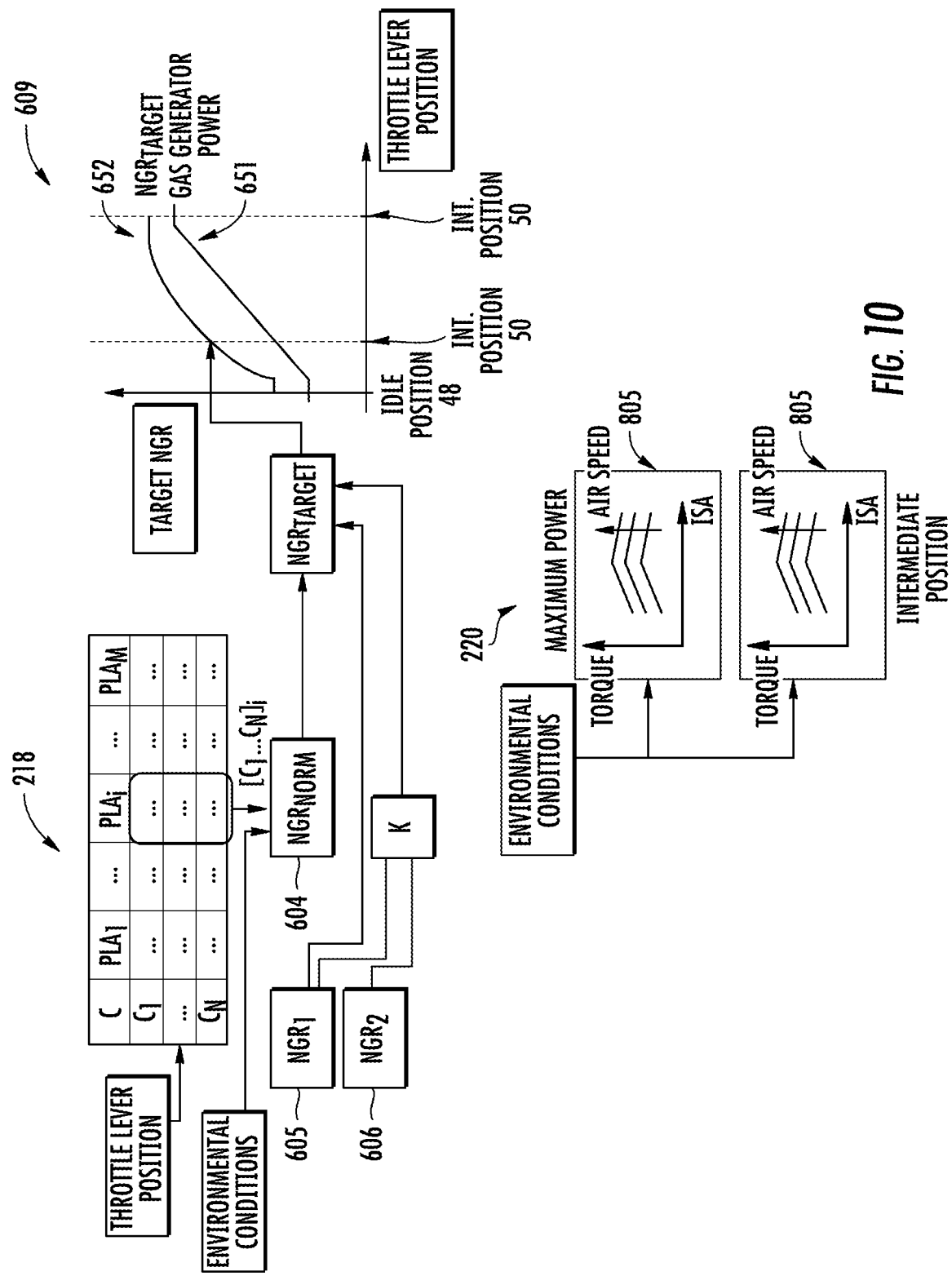
FIG. 10 illustrates an exemplary chart outlining steps of the method outlined in FIGS. 6-9.
Figure 11:
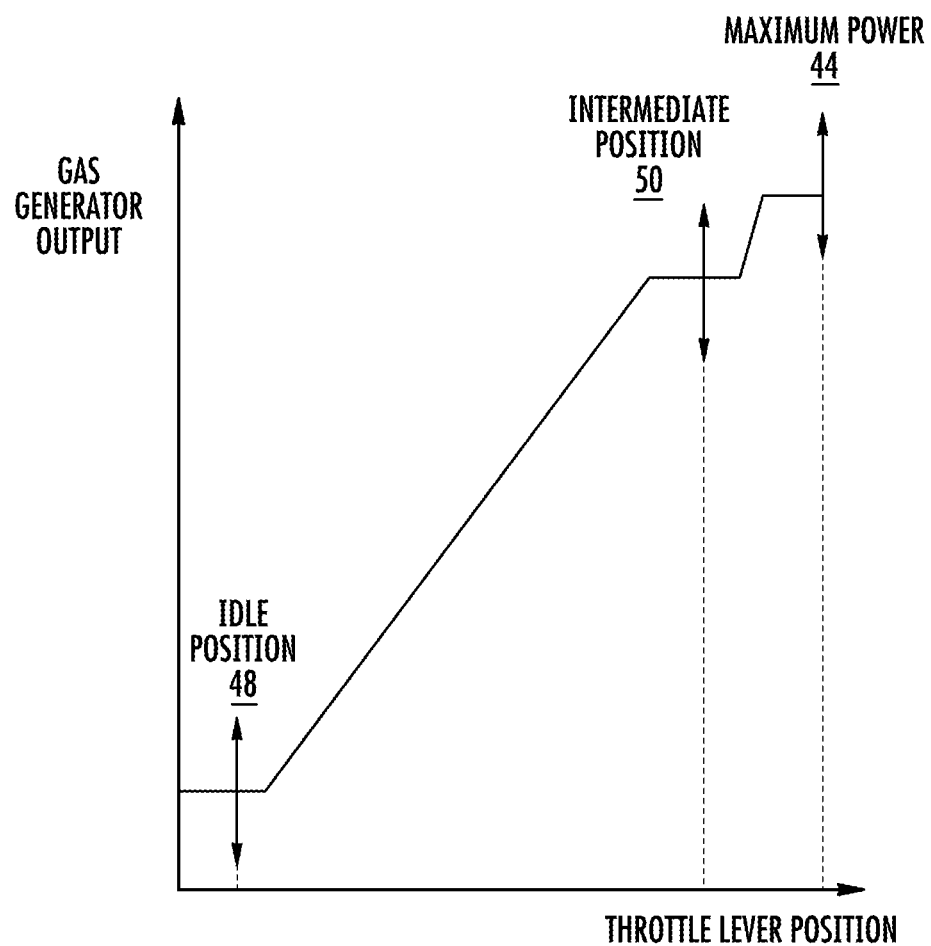
FIG. 11 illustrates an exemplary chart depicting gas generator output versus throttle lever position.

Referring to FIGS. 6-11, in conjunction with method 500, the gas generator speed output curve, such as shown schematically at 609 in FIG. 10, includes a gas generator power output curve 651 and a target gas generator shaft speed curve 652. The gas generator power output curve 651 is a predetermined function, table, or range of values of power (e.g., shaft horsepower, thrust, etc.) versus the plurality of throttle lever positions (e.g., power level angle or PLA), such as from the first position 44 or IDLE position 48 to the second position 46 or one or more intermediate positions 50 (see FIG. 2). The gas generator power output curve 651 correlates the throttle lever position to a desired power output. The target gas generator shaft speed curve 652 correlates the rotational speed of the gas generator shaft 160 to the desired gas generator power output. As the target gas generator shaft speed curve 652 varies non-linearly relative to throttle lever position based at least on the one or more environmental conditions, the gas generator torque curve 609 correlates the throttle lever position and desired gas generator power output to the target gas generator shaft speed necessary to deliver the desired gas generator power output while maintaining a linear relationship between the throttle lever position and the gas generator power output, such as generally depicted in FIG. 11.

Referring back to the method 500, in various embodiments at 509, generating the gas generator speed output curve includes at 504 calculating a normalized gas generator shaft speed ($NGR_{norm}$) via a first array of coefficients based on the throttle lever position and one or more environmental conditions. For example, referring back to FIG. 9, the first array of coefficients corresponds to the throttle lever position determined (e.g., interpolated or extracted from a look-up table) from the coefficient reference table 218. The normalized gas generator shaft speed $NGR_{norm}$ is calculated as a function of the first array of coefficients and the one or more environmental conditions (e.g., ambient temperature, ambient pressure, air speed).

In still various embodiments at 509, generating the gas generator speed output curve further includes at 505 calculating a first gas generator shaft speed based on a first reference curve; at 506 calculating a second gas generator shaft speed based on a second reference curve; and at 508 calculating the target gas generator shaft speed based on the normalized gas generator shaft speed, the first gas generator shaft speed, and the second gas generator shaft speed.

The first reference curve ($NGR_1$) 605 (see FIGS. 9 and 10) is based on a predetermined first gas generator speed and the one or more environmental conditions. For example, the first gas generator speed may correspond to the gas generator speed at IDLE condition given the one or more environmental conditions. In various embodiments, the first reference curve may define a function, look-up table, or curve that may interpolate or extrapolate the first gas generator speed relative to the one or more environmental conditions (e.g., relative to changes or differences in ambient temperature, ambient pressure, or air speed).

The second reference curve ($NGR_2$) 606 (see FIGS. 9 and 10) is based on a predetermined second gas generator speed and the one or more environmental conditions. For example, the second gas generator speed may correspond to the gas generator speed at the one or more intermediate positions 50 of the throttle input device 22. The one or more intermediate positions 50 may correspond to a MAX CRUISE or MAX CLIMB condition or power output of the gas generator 100.

In various embodiments, the second reference curve may define a function, look-up table, or curve that may interpolate or extrapolate the second gas generator speed relative to the one or more environmental conditions (e.g., relative to changes or differences in ambient temperature, ambient pressure, or air speed).

In various embodiments, the first reference curve ($NGR_1$) 605 and the second reference curve ($NGR_2$) 606 may each define a predetermined gas generator speed at one or more detents or positions of the throttle lever, such as, but not limited to, IDLE position, MAX CRUISE, or MAX CLIMB.

The method 500 may further include at 507 determining a first constant K based at least partially on a function of the second gas generator shaft speed and the first gas generator shaft speed. For example, referring to FIGS. 6-8 and 10, the first constant K is the difference in the second gas generator speed $NGR_2$ and the first gas generator speed $NGR_1$.

Referring still to FIGS. 6-10, generating the gas generator speed output curve at 509 (e.g., the gas generator speed output curve 609) is based at least partially on a function of the normalized gas generator shaft speed $NGR_{norm}$, (see 604 in FIGS. 9 and 10) the first constant K, and the first gas generator shaft speed $NGR_1$. More specifically, generating the target gas generator shaft speed curve 652 of the gas generator output torque curve 609 is based on calculating the target gas generator shaft speed $NGR_{target}$ relative to the throttle lever position. For example, calculating the target gas generator shaft speed $NGR_{target}$ may be defined by the sum of the first reference speed $NGR_1$ and a product of the first constant K and normalized gas generator shaft speed $NGR_{norm}$:

$$NGR_{target}=(K*NGR_{norm})+NGR_1$$

The controller 210 determines the first commanded fuel flow necessary to produce the target gas generator shaft speed $NGR_{target}$. As one or more of the environmental conditions changes, the throttle lever position, or both, changes, the controller 210 determines whether the gas generator output is based on producing a desired output torque based on the second commanded fuel flow or a target gas generator shaft speed based on the first commanded fuel flow.

In still various embodiments, the method 500 further includes at 535 (see FIG. 8) receiving at a controller a measured propeller speed via one or more sensors (e.g., speed sensor 241); at 540 determining a commanded propeller pitch angle based at least on a measured propeller speed; and at 550 adjusting the measured propeller speed based at least on the commanded propeller pitch angle.

In various embodiments, determining the commanded propeller pitch angle is based at least on the throttle lever position. For example, referring to FIGS. 3-4, determining the commanded propeller pitch angle θ of the blades 34 at the controller 210 is based on the throttle input device 22, the pitch angle sensor 242, and the propeller control unit 260. As another example, the propeller pitch angle is based on a desired rotational speed of the propeller assembly 30. In various embodiments, when the throttle lever position is in a reverse position (e.g., including MAXIMUM REVERSE), the commanded propeller pitch angle may, at least in part, determine a gas generator output (e.g., fuel flow at the gas generator 100 to produce a desired rotational speed of the propeller assembly 30, to produce a desired rotational speed of the gas generator 100, or both). In other embodiments, when the throttle lever position is in a forward position, the commanded propeller pitch angle is based, at least in part, on the gas generator output (e.g., fuel flow at the gas generator 100).

It should be appreciated that the embodiments of the system 200 and method 500 may be rearranged or altered, including omitting steps, without deviating from the scope of the present disclosure. Still further, in should be appreciated that while the system 200 and method 500 may provide a generally linear relationship between the gas generator output versus throttle lever position, such as provided in FIG. 11, it should be understood that the throttle lever may include one or more detents as a safety feature at which the throttle lever position does not induce a change in gas generator output, such as at a MAX CRUISE condition or a MAXIMUM POWER condition.

References to speed and sensors measuring speed, such as rotational speed of the gas generator shaft 160, the power turbine shaft 170, or the propeller shaft 190, or their associated sensors 240, 241, may further include determining, calculating, or otherwise providing a corrected speed based on one or more of a temperature of the fluid through which the shaft rotates (e.g., compressor inlet air temperature).

Although generally provided as a fixed-wing aircraft, the present disclosure may further apply to tilt-rotor aircraft or other apparatuses including a propeller assembly, such as a pitch-changing propeller assembly, and a gas generator coupled to an aircraft.

This written description uses examples to disclose the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling an output of a gas generator via an operator manipulated input device, the system comprising one or more sensors, wherein the one or more sensors are configured to measure one or more environmental conditions, a gas generator shaft speed, and a power turbine torque, wherein the system further comprises an operator manipulated input device and one or more controllers comprising one or more processors and one or more memory devices, and wherein the one or more memory devices store instructions that when executed by the one or more processors cause the one or more processors to perform operations, the operations comprising:

receiving, via the operator manipulated input device, a throttle lever position defining at least an idle position, a takeoff position, and one or more intermediate positions therebetween;

receiving, via the one or more sensors, one or more environmental conditions, wherein the one or more environmental conditions include one or more of an ambient air temperature, an ambient air pressure, and an ambient airflow rate;

determining, via the one or more controllers, a first commanded fuel flow of the gas generator based on a gas generator speed output curve based at least on the throttle lever position, the one or more environmental conditions, and a coefficient reference table;

determining, via the one or more controllers, a second commanded fuel flow of the gas generator based on a power turbine torque output curve based at least on the one or more environmental conditions;

determining, via the one or more controllers, whether to generate the gas generator output based at least on a measurement accuracy of the one or more sensors measuring the power turbine torque; and generating, via the gas generator, the gas generator output based on the first commanded fuel flow or the second commanded fuel flow, wherein the gas generator output is based on the first commanded fuel flow if the one or more sensors measuring the power turbine torque are beyond a predetermined accuracy threshold, and wherein the gas generator output is based on the second commanded fuel flow if the one or more sensors measuring the power turbine torque are not beyond the predetermined accuracy threshold.

2. The system of claim 1, wherein generating the gas generator output comprises generating the gas generator shaft speed based on the first commanded fuel flow or the power turbine torque based on the second commanded fuel flow.

3. The system of claim 1, wherein determining the first commanded fuel flow of the gas generator based on a gas generator speed output curve further comprises:

generating, via the one or more controllers, the gas generator speed output curve based at least on a target gas generator shaft speed curve and a gas generator power output curve, the target gas generator shaft speed curve based at least on the throttle lever position, the one or more environmental conditions, and the coefficient reference table comprising one or more arrays of coefficients versus one or more throttle lever positions.

4. The system of claim 3, wherein generating the gas generator speed output curve comprises:

calculating, via the one or more controllers, a normalized gas generator shaft speed via a first array of coefficients based on the throttle lever position and a function of the one or more environmental conditions and the one or more arrays of coefficients.

5. The system of claim 4, wherein generating the gas generator speed output curve further comprises:

calculating, via the one or more controllers, a first gas generator shaft speed based on a first reference curve, the first reference curve based on a predetermined first gas generator speed and the one or more environmental conditions;

calculating, via the one or more controllers, a second gas generator shaft speed based on a second reference curve, the second reference curve based on a predetermined second gas generator speed and the one or more environmental conditions; and calculating, via the one or more controllers, the target gas generator shaft speed based on the normalized gas generator shaft speed, the first gas generator shaft speed, and the second gas generator shaft speed.

6. The system of claim 5, wherein the first reference curve defines a lookup table, a curve, or an equation, and wherein the second reference curve is based on the first gas generator shaft speed versus one or more of the one or more environmental conditions.

7. The system of claim 5, wherein the second reference curve defines a lookup table, a curve, or an equation, and wherein the second reference curve is based on the second gas generator shaft speed versus one or more of the one or more environmental conditions.

8. The system of claim 5, wherein generating the gas generator speed output curve further comprises:

determining, via the one or more controllers, a first constant based at least partially on a function of the second gas generator shaft speed and the first gas generator shaft speed.

9. The system of claim 8, wherein generating the gas generator speed output curve is based at least partially on a function of the normalized gas generator shaft speed, the first constant, and the first gas generator shaft speed.

10. The system of claim 1, the operations further comprising:

receiving, via the one or more sensors, a measured propeller speed;

determining, via the one or more controllers, a commanded propeller pitch angle based at least on the measured propeller speed; and adjusting, via a propeller assembly, the measured propeller speed based at least on the commanded propeller pitch angle.

11. A method of controlling power and torque output of a gas generator and propeller assembly for an aircraft, the controlling of the output of the gas generator via an operator manipulated input device, using a system, the system comprising one or more sensors, wherein the one or more sensors are configured to measure one or more environmental conditions, a gas generator shaft speed, and a power turbine torque, wherein the system further comprises an operator manipulated input device and one or more controllers comprising one or more processors and one or more memory devices, and wherein the one or more memory devices store instructions that when executed by the one or more processors cause the one or more processors to perform the method, the method comprising:

receiving, via the operator manipulated input device, a throttle lever position defining at least an idle position, a takeoff position, and one or more intermediate positions therebetween;

receiving, via the one or more sensors, one or more environmental conditions, wherein the one or more environmental conditions include one or more of an ambient air temperature, an ambient air pressure, and an ambient airflow rate;

determining, via the controller, a first commanded fuel flow of the gas generator based on a gas generator speed output curve based at least on a throttle lever position, one or more environmental conditions, and a coefficient reference table;

determining, via the controller, a second commanded fuel flow of the gas generator based on a power turbine torque output curve based at least on the one or more environmental conditions;

determining, via the controller, whether to generate the gas generator output based at least on a measurement accuracy of the one or more sensors measuring the power turbine torque; and generating, via the gas generator, the gas generator output based on the first commanded fuel flow or the second commanded fuel flow, wherein the gas generator output is based on the first commanded fuel flow if the one or more sensors measuring the power turbine torque are beyond a predetermined accuracy threshold, and wherein the gas generator output is based on the second commanded fuel flow if the one or more sensors measuring the power turbine torque are not beyond the predetermined accuracy threshold.

12. The method of claim 11, wherein determining a first commanded fuel flow of the gas generator based on a gas generator speed output curve further comprises:

generating the gas generator speed output curve based at least on a target gas generator shaft speed curve and a gas generator power output curve, the target gas generator shaft speed curve based at least on the throttle lever position, the one or more environmental conditions, and the coefficient reference table comprising one or more arrays of coefficients versus one or more throttle lever positions.

13. The method of claim 12, wherein generating the gas generator speed output curve comprises:
calculating a normalized gas generator shaft speed via a first array of coefficients based on the throttle lever position and a function of the one or more environmental conditions and the first array of coefficients.

14. The method of claim 13, wherein generating the gas generator speed output curve further comprises:
calculating a first gas generator shaft speed based on a first reference curve, the first reference curve based on a predetermined first gas generator speed and the one or more environmental conditions;
calculating a second gas generator shaft speed based on a second reference curve, the second reference curve based on a predetermined second gas generator speed and the one or more environmental conditions; and
calculating the target gas generator shaft speed based on the normalized gas generator shaft speed, the first gas generator shaft speed, and the second gas generator shaft speed.

15. The method of claim 11, the method further comprising:
determining a commanded propeller pitch angle based at least on a measured propeller speed; and
adjusting the measured propeller speed based at least on the commanded propeller pitch angle.

* * * * *